UNITED STATES PATENT OFFICE.

ARTHUR STANLEY QUICK, OF LONDON, ENGLAND, ASSIGNOR TO MILTON BARTHOLOMEW, OF LONDON, ENGLAND.

PLASTIC COMPOSITION.

1,084,900.  Specification of Letters Patent.  Patented Jan. 20, 1914.

No Drawing.  Application filed December 3, 1912. Serial No. 734,699.

*To all whom it may concern:*

Be it known that I, ARTHUR STANLEY QUICK, a subject of the King of Great Britain and Ireland, residing at 123 Loughborough Park, London, England, have invented new and useful Improvements in Plastic Compositions, of which the following is a specification.

This invention relates to an improved composition or material adapted for use in the manufacture of articles of an ornamental or useful character, such as slabs, tiles, or the like, or for use as a plaster or coating for walls, ceilings or other surfaces, or as a floor covering either with or without a backing of canvas, or as an insulating material for use in electrical apparatus or refrigerators, and for many other purposes.

In carrying out my invention, I employ in approximately the proportions stated the following materials: 4 parts of pressed yeast in a condensed or semi-solid condition. 1 part of brown paper or wood pulp, or pulped oakum, flock or flock dust, jute or jute dust, or pulped textile fabric, such material still retaining its fiber. For certain uses I also employ 1 part of gum or shellac varnish, or an emulsion of the same in an aqueous solution of soda salts to which a small proportion of pressed yeast may be added. Or, again, 1 part of silicate of soda may be introduced. The yeast and pulp in or in about the proportions stated are thoroughly mixed together in a cold state in a mixing machine and are then heated to a temperature of about 140° Fahrenheit, and where a flexible composition is required varnish is added, or, again, if the material is required to be hardened silicate of soda is introduced. For other uses, all the materials may be used, the stirring being still continued until, after being thoroughly admixed, the composition is ready for use either by molding, pressing or otherwise working the same according to the purpose contemplated. Where the material is required to be of a waterproof character, I add to the composition about 8 parts of vegetable oil or emulsion of such oil in the aqueous solution of soda salts, to which a small proportion of pressed yeast may be added before or after heating.

According to a modification of my invention, I add to the principal ingredients above referred to, namely yeast and fibrous matter, a suitable quantity of dried and ground spent hops. Under such conditions, the hops should be in the proportion of about 3 parts as against 4 parts of yeast and 1 part of fibrous matter.

In making molded articles I place the material, while heated, in a mold and preferably press same therein and allow it to cool, whereupon it thoroughly hardens and retains the form imparted to it. When the finished product is required to be of sheet form, I spread the heated composition upon sheets or trays of metal or other suitable material, which are suitably greased to prevent adhesion, and allow it to cool. The composition may then be passed between heated rollers to compress the same and afterward passed between cold rollers to burnish or polish the surface and further compress them, after which the sheets can be cut to the sizes required. If employed as a plaster or surfacing for walls, ceilings, or floors, the composition is applied in a heated condition in the usual manner. Any suitable coloring matter may be added, where desired.

I claim:—

1. The process of making a composition or material, which comprises thoroughly mixing a mass containing yeast in a condensed or semi-solid condition with a fabric-forming fibrous material, then heating the mixture to a suitable temperature; and shaping the resultant product while in a heated condition.

2. A plastic composition containing yeast, ground spent hops and fibrous matter.

3. A product containing a large quantity of yeast and a smaller quantity of fibrous matter, the fibers of which are long enough to produce a felted mass.

ARTHUR STANLEY QUICK.

Witnesses:
HERBERT D. JAMESON,
ORLANDO J. WORTH.